United States Patent [11] 3,631,404

[72] Inventors Donn E. Bernhardt; Perry W. Penton, both of Phoenix, Ariz.
[21] Appl. No. 845,397
[22] Filed July 28, 1969
[45] Patented Dec. 28, 1971
[73] Assignee General Electric Company

[54] DATA COMMUNICATION SYSTEM INCLUDING ADDRESS-GENERATING MEANS AND METHOD
5 Claims, 1 Drawing Fig.

[52] U.S. Cl. .......... 340/172.5
[51] Int. Cl. .......... G06f 3/04, G06f 9/20
[50] Field of Search .......... 235/157; 340/172.5

[56] References Cited

UNITED STATES PATENTS

| | | | |
|---|---|---|---|
| 3,344,410 | 9/1967 | Collins et al. | 340/172.5 |
| 3,465,298 | 10/1969 | La Duke et al. | 340/172.5 |
| 3,475,729 | 10/1969 | Porcelli et al. | 340/172.5 |
| 3,500,333 | 3/1970 | Couleur et al. | 340/172.5 |

*Primary Examiner*—Raulfe B. Zache
*Assistant Examiner*—Melvin B. Chapnick
*Attorneys*—Edward W. Hughes and Fred Jacob

ABSTRACT: The controller provided services transmit and receive queues of data in a data processor memory, in a manner which is substantially independent of the data processor in respect to the transfer in and out of the queues of messages to and from data terminals.

Patented Dec. 28, 1971 3,631,404

INVENTORS
DONN E. BERNHARDT
PERRY W. PENTON

DATA COMMUNICATION SYSTEM INCLUDING ADDRESS-GENERATING MEANS AND METHOD

BACKGROUND OF THE INVENTION

The present invention relates generally to data communication systems and more particularly to an online data communication system including means for generating data cell addresses for the retrieval of information from data cells in a working store and for transferring the information retrieved from the store to a selected one or ones of a plurality of receivers.

1. Field of the Invention

Online data communication systems have rapidly become a necessary adjunct to the everyday business world in applications such as merchandising, general data processing, business management, etc. To incorporate a data communication system into a business frequently requires the fast retrieval of information from a data processor memory for transmission to a large number of external devices such as remote teletypes. This problem of the fast retrieval of information is normally dependent upon how expeditiously memory addresses can be developed by the data processor. Many solutions to the problem have been posed, all of which include expensive arrangements of computer equipment and data communications hardware and which frequently entail extensive and efficient software programs.

2. Description of Prior Art

Those data communication systems most prevalent in the art are comprised of a plurality of remote terminals which communicate with a data processor through suitable transmit and receive buffer logic. In recent years, it has become desirable to operate data processors in data communication systems in a multiprogramming environment. One of the major problems encountered in this multiprogramming environment is that of being able to retrieve information from the data processor memory quickly enough to service the various terminals and still have sufficient time left over to process data in the data processor.

The retrieval of information from the data processor memory for transmission to a plurality of terminals is normally done under the control of a stored computer program (commonly referred to as software) or, by an interacting combination of hardware and software. The predominant feature which slows down most data communication systems is this interaction of hardware and software which requires a great many memory accesses in order to retrieve certain control words for controlling the retrieval of information from the memory for transmission to the various terminals.

When transmitting information, the several output channels in the data processor are addressed by the processor under the control of instructions received from the memory and are loaded with information also retrieved from the memory.

When considering the various types of prior art systems which require several memory access times for the retrieval of each item or items of information from the memory, it is obvious that these systems are very slow and require considerable software for their operation. These types of systems serve well when it is only necessary to transmit information from a data processor memory to a small number or remote devices or terminals. However, in large data communication systems where several hundred remote devices require information substantially simultaneously, a faster memory-addressing scheme is required.

SUMMARY OF THE INVENTION

The communication system of the present invention alleviates this problem of the prior art by providing a unique address-generating means for rapidly developing memory addresses for the retrieval of information items from a data processor memory for subsequent transmission to a plurality of receiving devices. In the present invention, a communication controller intermediate a data processor memory and a plurality of external receivers provides this unique address-generating means.

As shown in the illustrated embodiment, the controller contains a central control and a plurality of transmit sections each including a plurality of line units. The controller retrieves message words from memory locations specified by memory addresses developed by the controller. Each of the transmit sections and their associated line units is capable of generating address indicia in response to a message word retrieved from the memory by the controller. This indicia is used to retrieve an additional message word from the memory for transmission to a terminal associated with the line unit. As each message word is retrieved from memory by the controller, it updates the address indicia in preparation to address another location in memory. The line units are selected by a selector means in each of the transmit sections such that each line unit gains access to memory as required. In addition, the selector means also provides a portion of the memory address of each line unit which is representative of the line unit accessing memory.

It is therefore an object of the present invention to provide a data communication system having enhanced memory addressing capability.

It is another object of the present invention to provide a data communication system including means for generating memory addresses for the retrieval of information from a data processor memory for subsequent transmission to a plurality of remote sources.

It is still another object to provide a data communications controller capable of generating memory addresses directly associated with individual transmit line units within the communication controller.

It is a further object to provide a communication controller having a plurality of output line units for generating memory addresses directly associated with the line units.

A still further object is to provide a means in a data communication system for developing a plurality of circular queue memory addresses for retrieving information from a memory in a data processor.

A further object is to provide a plurality of line units in a communication controller each capable of generating address indicia for addressing memory locations in a data processor memory.

The foregoing and other objects will become apparent as this description proceeds and the features of novelty which characterize the invention will be pointed out in particularity in the claims annexed to and forming a part of this specification.

BRIEF DESCRIPTION OF THE DRAWING

The present invention may be more readily described and understood by reference to the accompanying drawing, in which:

The FIGURE is a major block diagram illustrating the major components of the data communication system of the present invention.

DESCRIPTION OF THE PREFERRED EMBODIMENT

Figure 1:
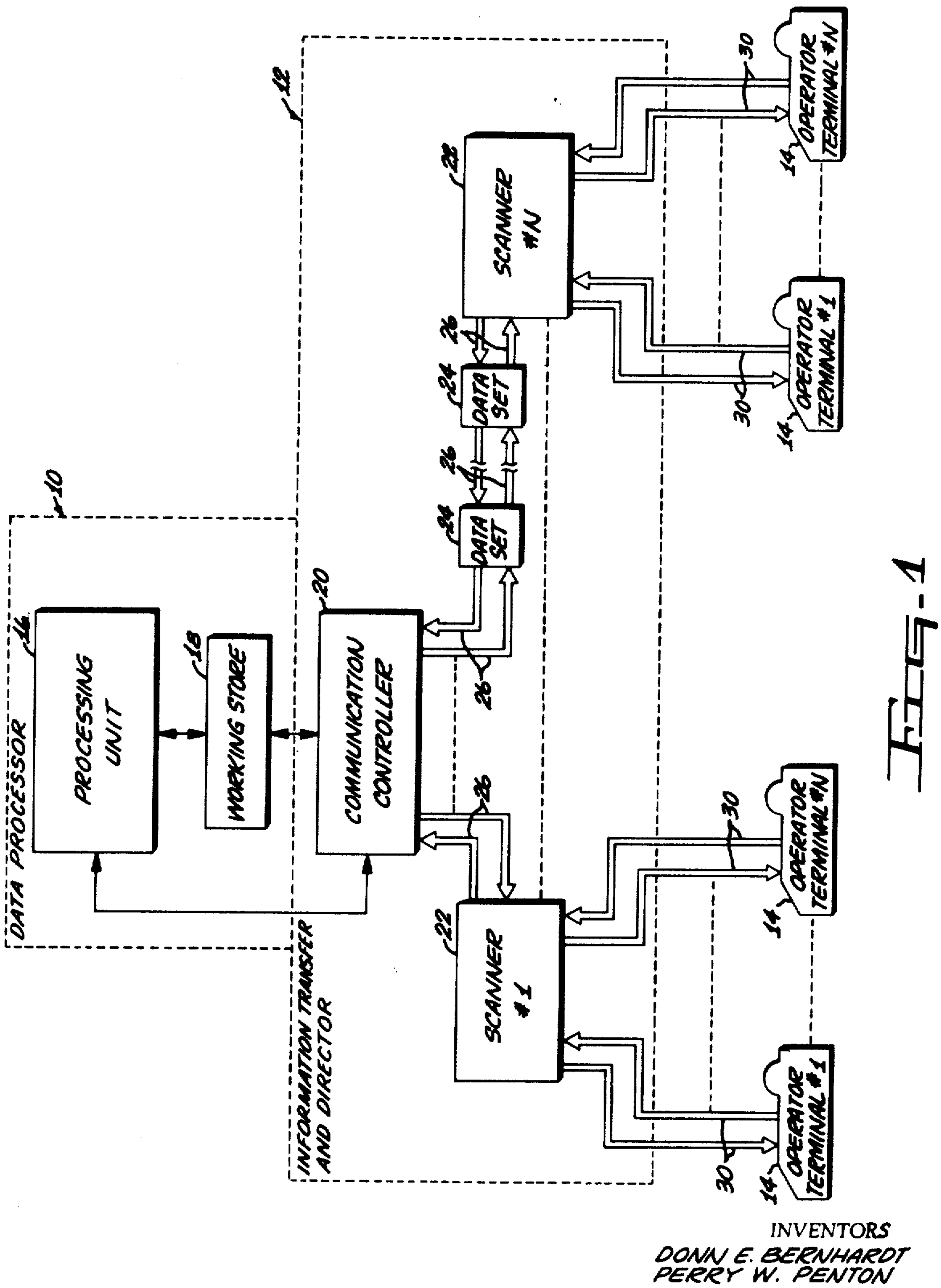

Referring now to the FIGURE there is shown in block diagram form a data communication system comprising, a data processor 10, an information transfer and director 12, and a plurality of terminal devices (terminals) 14. Included within the data processor 10 is a processing unit 16 and a working store or memory 18. The data processor 10 operates in conjunction with the director 12 for the bidirectional transfer of information items representative of messages between the director 12 and the terminals 14.

The information transfer and director 12 is comprised of a communication controller 20 and a plurality of scanner devices 22 operating through full duplex communication lines 30 to the terminals 14. Also shown included in the director 12 are data sets 24 illustrating a typical interconnection of a one of a plurality of full duplex communication lines 26 between the communication controller 20, and a one of the scanner devices 22 (scanner #N). These data sets are used to exemplify that telephone communication lines may be employed in the present system when the distances between the scanners 22 and the controller 20 necessitate long distance communication. However, if the distances between the controller 20 and the scanners 22 is relatively short, such as less than a mile, the scanners 22 may be connected directly to the controller 20 without the use of these data sets. This latter connection is illustrated in the FIGURE by the connection of a different one of the full duplex lines 26 interconnecting a one of the scanners 22 (scanner #1) to the controller 20.

In a manner similar to lines 26, there is a full duplex line 30 interconnecting each of the terminals 14 to an associated one of the scanners 22. Full duplex lines 26 and 30 symbolically represent communication links for the transfer of information items between the terminals 14 and the controller 20, such as intelligence in serialized digital data form representative of alphabetic characters, numeric quantities, control characters, address entities, etc.

Also shown in the FIGURE are lines interconnecting the processing unit 16 and the working store 18 to the controller 20. These interconnecting lines symbolically represent flow paths for the transfer of information items and memory or data cell addresses between the data processor 10 and the controller 20. They also represent control signal paths for control signals which control the flow of the information items between the communication controller 20 and the data processor 10.

For a complete description of the system and arrangement of the FIGURE of the present invention, reference is made to U.S. Pat. Ser. No. 845,398, filed July 28, 1969, entitled "Data Communication System Including Automatic Information Transfer Control Means" by John F. Baltzly et al. and assigned to the assignee of the present invention. More particularly, attention is directed to the drawings and to the specification beginning at page C2 and ending at page C135 of U.S. Pat. application, Ser. No. 845,398, which are incorporated herein by reference and made a part hereof as if fully set forth herein.

We claim:

1. A data communication system comprising:

a data processor;

a memory in communication with said processor, said memory having a plurality of individually addressable storage cells each of said cells being capable of holding a data word;

a plurality of external devices for receiving data words retrieved from said memory;

and means intermediate said memory and said external devices for supplying addresses to said memory for the retrieval of data words therefrom;

means for directing the transfer of data words retrieved to individual ones of said external devices, said means including a plurality of line units for transferring retrieved data words to said devices, selector means for successively selecting individual ones of said plurality of line units, and address-generating means for generating cell addresses of said individually addressable storage cells to be supplied to said memory, said address-generating means responsive to the selection of one of said line units to form a first portion of said cell address and responsive to the last previously received data word by the selected line unit to form a second portion of said cell address.

2. A data communication system comprising:

a data processor;

a memory in communication with said processor, said memory having a plurality of individually addressable storage cells each of said cells being capable of holding a data word;

a plurality of external devices for receiving data words retrieved from said memory;

and means intermediate said memory and said external devices for supplying addresses to said memory for the retrieval of data words therefrom;

means for directing the transfer of data words retrieved to individual ones of said external devices, said means including a plurality of line units for transferring retrieved information items to said devices and for providing a first signal indicative of each receipt of a data word, selector means for successively selecting individual ones of said plurality of line units and for providing a second signal indicative of the line unit selected, and address-generating means for generating cell addresses of said individually addressable storage cells to be supplied to said memory, said address generating means responsive to said first and said second signals to form respectively first and second portions of said cell address.

3. A method of selectively providing information items retained in a data store to one of a plurality of devices external to said store comprising the steps of:

providing a plurality of line units for transmitting information items retrieved from said store to selected ones of said devices;

selecting said switching means one of said units;

generating signals representing a first address portion in response to the unit so selected;

counting the number of information items transferred from said data store by each of said units to provide signals representing a count;

and generating an address for the retrieval of information from said data store by combining said signals providing indicia of the selected unit and said count and supplying said address to said data store.

4. An information transfer controller and director, for servicing portions of a data processor working store memory having queues of messages for a network of communications data terminals, comprising:

a plurality of character register means for transmission and reception of character data to and from data terminals;

a plurality of word registers, each word register being connected to a plurality of said character register means, for holding data from a memory cell and selectively transferring character data to said character registers;

selector means, connected to said word register means, for selectively transferring data to said character register means;

base register means for holding data representing an address in working store memory of a queue of messages;

a plurality of word count means, connected to said selector means, for holding data representing current message word pointer information;

address-generating means, connected to said base register means, and said word count means, for forming an address of a cell in working store memory for transfer of data to said word registers;

transmit control means, connected to said word registers and said address-generating means, for successively selecting said word registers to receive data from a memory and applying signals representing this selection to said address-generating means.

5. An information transfer controller and director, for servicing portions of a data processor working store memory having queues of messages for a network of communications data terminals, comprising:

a plurality of receive scanners, each scanner including an incoming character register, for successively receiving character data from a plurality of data terminals;

a plurality of receive line units, each unit connected to a plurality of said receive scanners, for selectively receiving character data, each said receive line unit including:

selector means for selecting said receive scanners, control means for combining a plurality of data characters for said word register, message location means for holding data representing word pointer information, address-generating means, connected to said control means and said message location means, for forming an address of a cell in working store memory for transfer of word data from said receive line units.